United States Patent
Tur et al.

(10) Patent No.: US 9,454,962 B2
(45) Date of Patent: Sep. 27, 2016

(54) SENTENCE SIMPLIFICATION FOR SPOKEN LANGUAGE UNDERSTANDING

(75) Inventors: Gokhan Tur, Fremont, CA (US); Dilek Hakkani-Tur, Fremont, CA (US); Larry Paul Heck, Los Altos, CA (US); Sarangarajan Parthasarathy, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 930 days.

(21) Appl. No.: 13/106,374

(22) Filed: May 12, 2011

(65) Prior Publication Data

US 2012/0290290 A1  Nov. 15, 2012

(51) Int. Cl.
*G10L 15/26* (2006.01)
*G06F 17/27* (2006.01)

(52) U.S. Cl.
CPC .......... *G10L 15/26* (2013.01); *G06F 17/2785* (2013.01)

(58) Field of Classification Search
CPC ............ G06F 17/2785; G06F 17/274; G06F 17/271; G06F 17/277; G06F 17/2755
USPC .............................................................. 704/9
See application file for complete search history.

(56) References Cited

U.S. PATENT DOCUMENTS

| | | | | |
|---|---|---|---|---|
| 4,560,977 A | * | 12/1985 | Murakami et al. | 341/118 |
| 4,688,195 A | * | 8/1987 | Thompson | G06F 3/0489 706/11 |
| 4,727,354 A | * | 2/1988 | Lindsay | 341/106 |
| 4,772,946 A | * | 9/1988 | Hammer | 375/240.02 |
| 4,811,398 A | * | 3/1989 | Copperi et al. | 704/230 |
| 4,868,750 A | * | 9/1989 | Kucera et al. | 704/8 |
| 4,969,192 A | * | 11/1990 | Chen et al. | 704/222 |
| 5,146,406 A | * | 9/1992 | Jensen | G06F 17/271 704/9 |
| 5,259,766 A | * | 11/1993 | Sack | G09B 19/0053 434/323 |
| 5,265,014 A | | 11/1993 | Haddock et al. | |
| 5,299,125 A | | 3/1994 | Baker | |
| 5,325,298 A | * | 6/1994 | Gallant | 704/9 |
| 5,600,765 A | | 2/1997 | Ando et al. | |
| 5,680,628 A | | 10/1997 | Carus et al. | |
| 5,748,974 A | | 5/1998 | Johnson | |
| 5,861,886 A | | 1/1999 | Moan et al. | |
| 5,880,743 A | | 3/1999 | Moran et al. | |
| 5,930,746 A | * | 7/1999 | Ting | G06F 17/271 704/2 |
| 5,970,446 A | | 10/1999 | Goldberg et al. | |

(Continued)

FOREIGN PATENT DOCUMENTS

| | | |
|---|---|---|
| CN | 1313972 A | 9/2001 |
| CN | 1325527 A | 12/2001 |

(Continued)

OTHER PUBLICATIONS

International Search Report & Written Opinion in PCT/US2012/031722 dated Oct. 23, 2012.

(Continued)

*Primary Examiner* — Fariba Sirjani

(74) *Attorney, Agent, or Firm* — Steven Spellman; Tom Wong; Micky Minhas

(57) ABSTRACT

Sentence simplification may be provided. A spoken phrase may be received and converted to a text phrase. An intent associated with the text phrase may be identified. The text phrase may then be reformatted according to the identified intent and a task may be performed according to the reformatted text phrase.

20 Claims, 4 Drawing Sheets

(56) References Cited

U.S. PATENT DOCUMENTS

| | | | |
|---|---|---|---|
| 6,212,494 B1* | 4/2001 | Boguraev | 704/9 |
| 6,222,465 B1 | 4/2001 | Kumar et al. | |
| 6,246,981 B1 | 6/2001 | Papineni et al. | |
| 6,256,033 B1 | 7/2001 | Nguyen | |
| 6,397,179 B2 | 5/2002 | Crespo et al. | |
| 6,401,086 B1* | 6/2002 | Bruckner | |
| 6,411,725 B1 | 6/2002 | Rhoads | |
| 6,512,838 B1 | 1/2003 | Rafii et al. | |
| 6,539,931 B2 | 4/2003 | Trajkovic | |
| 6,658,377 B1* | 12/2003 | Anward | G06F 17/271 704/9 |
| 6,665,640 B1 | 12/2003 | Bennett et al. | |
| 6,674,877 B1 | 1/2004 | Jojic et al. | |
| 6,895,083 B1* | 5/2005 | Bers et al. | 379/88.01 |
| 6,950,534 B2 | 9/2005 | Cohen et al. | |
| 6,970,947 B2 | 11/2005 | Ebling et al. | |
| 6,990,639 B2 | 1/2006 | Wilson | |
| 6,999,932 B1 | 2/2006 | Zhou | |
| 7,050,977 B1* | 5/2006 | Bennett | 704/270.1 |
| 7,100,082 B2* | 8/2006 | Little | G06F 11/2257 706/47 |
| 7,227,526 B2 | 6/2007 | Hildreth et al. | |
| 7,231,609 B2 | 6/2007 | Baudisch | |
| 7,251,781 B2* | 7/2007 | Batchilo et al. | 715/210 |
| 7,272,601 B1 | 9/2007 | Wang et al. | |
| 7,308,112 B2 | 12/2007 | Fujimura et al. | |
| 7,317,836 B2 | 1/2008 | Fujimura et al. | |
| 7,328,216 B2 | 2/2008 | Hofmann et al. | |
| 7,366,655 B1* | 4/2008 | Gupta | G06F 17/279 704/10 |
| 7,367,887 B2 | 5/2008 | Watabe et al. | |
| 7,519,223 B2 | 4/2009 | Dehlin et al. | |
| 7,590,262 B2 | 9/2009 | Fujimura et al. | |
| 7,596,767 B2 | 9/2009 | Wilson | |
| 7,606,700 B2* | 10/2009 | Ramsey et al. | 704/9 |
| 7,640,164 B2 | 12/2009 | Sasaki et al. | |
| 7,665,041 B2 | 2/2010 | Wilson et al. | |
| 7,672,845 B2 | 3/2010 | Beranek et al. | |
| 7,704,135 B2 | 4/2010 | Harrison, Jr. | |
| 7,716,056 B2* | 5/2010 | Weng | G10L 15/22 704/10 |
| 7,720,674 B2* | 5/2010 | Kaiser et al. | 704/9 |
| 7,720,856 B2 | 5/2010 | Godecke et al. | |
| 7,747,438 B2 | 6/2010 | Nguyen et al. | |
| 7,756,708 B2 | 7/2010 | Cohen et al. | |
| 7,869,998 B1* | 1/2011 | Di Fabbrizio | G10L 13/00 704/1 |
| 7,890,500 B2* | 2/2011 | Bobrow et al. | 707/722 |
| 7,890,539 B2* | 2/2011 | Boschee et al. | 707/794 |
| 8,000,453 B2 | 8/2011 | Cooper et al. | |
| 8,019,610 B2* | 9/2011 | Walker | G10L 13/027 704/270 |
| 8,108,208 B2 | 1/2012 | Makela | |
| 8,117,635 B2 | 2/2012 | Hendricks | |
| 8,144,840 B2 | 3/2012 | Luehrig et al. | |
| 8,155,962 B2 | 4/2012 | Kennewick et al. | |
| 8,165,886 B1 | 4/2012 | Gagnon | |
| 8,180,629 B2 | 5/2012 | Rehberg | |
| 8,260,817 B2* | 9/2012 | Boschee et al. | 707/794 |
| 8,265,925 B2* | 9/2012 | Aarskog | 704/9 |
| 8,317,518 B2 | 11/2012 | Jarrell | |
| 8,335,754 B2* | 12/2012 | Dawson | G06F 17/2705 706/45 |
| 8,380,489 B1* | 2/2013 | Zhang | 704/4 |
| 8,448,083 B1 | 5/2013 | Migos | |
| 8,489,115 B2 | 7/2013 | Rodriguez et al. | |
| 8,521,766 B1 | 8/2013 | Hoarty | |
| 8,595,222 B2* | 11/2013 | Dean | 707/725 |
| 8,595,642 B1 | 11/2013 | Lagassey | |
| 8,600,747 B2 | 12/2013 | Abella et al. | |
| 8,612,208 B2 | 12/2013 | Cooper et al. | |
| 8,825,661 B2 | 9/2014 | Joshi et al. | |
| 9,064,006 B2 | 6/2015 | Hakkani-Tur et al. | |
| 9,082,402 B2* | 7/2015 | Yadgar | G10L 15/1822 |
| 9,123,341 B2 | 9/2015 | Weng | |
| 9,244,984 B2 | 1/2016 | Heck | |
| 2001/0020954 A1 | 9/2001 | Hull | |
| 2001/0053968 A1* | 12/2001 | Galitsky | G06F 17/30722 704/9 |
| 2003/0125955 A1 | 7/2003 | Arnold et al. | |
| 2003/0236099 A1 | 12/2003 | Deisher et al. | |
| 2004/0078725 A1* | 4/2004 | Little | G06F 11/2257 714/48 |
| 2004/0083092 A1* | 4/2004 | Valles | G06F 17/2785 704/9 |
| 2004/0117189 A1* | 6/2004 | Bennett | G06F 17/27 704/270.1 |
| 2004/0122674 A1 | 6/2004 | Bangalore et al. | |
| 2004/0172460 A1 | 9/2004 | Marel et al. | |
| 2004/0189720 A1 | 9/2004 | Wilson et al. | |
| 2004/0193420 A1 | 9/2004 | Kennewick et al. | |
| 2004/0220797 A1 | 11/2004 | Wang et al. | |
| 2005/0033582 A1* | 2/2005 | Gadd et al. | 704/277 |
| 2005/0074140 A1 | 4/2005 | Grasso et al. | |
| 2005/0278164 A1* | 12/2005 | Hudson | G06F 17/30684 704/4 |
| 2005/0289124 A1 | 12/2005 | Kaiser et al. | |
| 2006/0036430 A1* | 2/2006 | Hu | G06F 17/271 704/10 |
| 2006/0074631 A1 | 4/2006 | Wang et al. | |
| 2006/0074883 A1 | 4/2006 | Teevan et al. | |
| 2006/0080101 A1* | 4/2006 | Chotimongkol | G06F 17/278 704/257 |
| 2006/0136375 A1* | 6/2006 | Cox | G06F 17/30657 |
| 2006/0173868 A1 | 8/2006 | Angele et al. | |
| 2006/0206333 A1 | 9/2006 | Paek et al. | |
| 2006/0206336 A1 | 9/2006 | Gurram et al. | |
| 2006/0206454 A1 | 9/2006 | Forstall et al. | |
| 2006/0235689 A1* | 10/2006 | Sugihara | G06F 17/2785 704/257 |
| 2006/0271353 A1* | 11/2006 | Berkan | G06F 17/30864 704/9 |
| 2006/0271520 A1 | 11/2006 | Ragan | |
| 2006/0293874 A1 | 12/2006 | Zhang et al. | |
| 2007/0038436 A1 | 2/2007 | Cristo et al. | |
| 2007/0071209 A1 | 3/2007 | Horvitz et al. | |
| 2007/0100624 A1* | 5/2007 | Weng et al. | 704/257 |
| 2007/0106497 A1 | 5/2007 | Ramsey et al. | |
| 2007/0118357 A1 | 5/2007 | Kasravi et al. | |
| 2007/0124134 A1 | 5/2007 | Van Kommer | |
| 2007/0136068 A1 | 6/2007 | Horvitz | |
| 2007/0136222 A1* | 6/2007 | Horvitz | 706/45 |
| 2007/0299799 A1 | 12/2007 | Meehan et al. | |
| 2008/0005068 A1 | 1/2008 | Dumais et al. | |
| 2008/0040510 A1 | 2/2008 | Warner et al. | |
| 2008/0080678 A1 | 4/2008 | Ma et al. | |
| 2008/0082518 A1 | 4/2008 | Loftesness | |
| 2008/0097951 A1* | 4/2008 | Gupta et al. | 706/59 |
| 2008/0140389 A1* | 6/2008 | Funakoshi | G06F 17/2785 704/9 |
| 2008/0140657 A1 | 6/2008 | Azvine et al. | |
| 2008/0152191 A1 | 6/2008 | Fujimura et al. | |
| 2008/0167876 A1* | 7/2008 | Bakis et al. | 704/260 |
| 2008/0168037 A1 | 7/2008 | Kapadia et al. | |
| 2008/0172359 A1 | 7/2008 | Lundell et al. | |
| 2008/0201280 A1 | 8/2008 | Martin et al. | |
| 2008/0201434 A1 | 8/2008 | Holmes et al. | |
| 2008/0221870 A1* | 9/2008 | Attardi et al. | 704/9 |
| 2008/0228467 A1* | 9/2008 | Womack | G06F 17/271 704/9 |
| 2008/0231926 A1 | 9/2008 | Klug et al. | |
| 2008/0235199 A1* | 9/2008 | Li et al. | 707/4 |
| 2008/0300871 A1 | 12/2008 | Gilbert | |
| 2008/0306934 A1 | 12/2008 | Craswell et al. | |
| 2008/0319962 A1* | 12/2008 | Riezler | G06F 17/30672 |
| 2009/0006333 A1 | 1/2009 | Jones et al. | |
| 2009/0006345 A1 | 1/2009 | Platt et al. | |
| 2009/0006389 A1 | 1/2009 | Piscitello et al. | |
| 2009/0012842 A1* | 1/2009 | Srinivasan et al. | 705/10 |
| 2009/0027337 A1 | 1/2009 | Hildreth | |
| 2009/0055380 A1 | 2/2009 | Peng et al. | |
| 2009/0076917 A1 | 3/2009 | Jablokov et al. | |
| 2009/0077047 A1 | 3/2009 | Cooper et al. | |
| 2009/0079813 A1 | 3/2009 | Hildreth | |

(56) References Cited

U.S. PATENT DOCUMENTS

| | | |
|---|---|---|
| 2009/0089126 A1* | 4/2009 | Odubiyi .......................... 705/7 |
| 2009/0094036 A1 | 4/2009 | Ehlen et al. |
| 2009/0112596 A1 | 4/2009 | Syrdal et al. |
| 2009/0112782 A1 | 4/2009 | Cross et al. |
| 2009/0141933 A1 | 6/2009 | Wagg |
| 2009/0177645 A1 | 7/2009 | Heck |
| 2009/0221368 A1 | 9/2009 | Yen et al. |
| 2009/0232288 A1 | 9/2009 | Forbes et al. |
| 2009/0234655 A1 | 9/2009 | Kwon |
| 2009/0248422 A1 | 10/2009 | Li et al. |
| 2009/0248659 A1 | 10/2009 | McCool et al. |
| 2009/0281789 A1 | 11/2009 | Waibel et al. |
| 2009/0292687 A1* | 11/2009 | Fan et al. ......................... 707/5 |
| 2009/0315740 A1 | 12/2009 | Hildreth et al. |
| 2010/0023320 A1 | 1/2010 | Di Cristo et al. |
| 2010/0023331 A1 | 1/2010 | Duta et al. |
| 2010/0036717 A1 | 2/2010 | Trest |
| 2010/0036831 A1* | 2/2010 | Vemuri ............ G06F 17/30516 707/707 |
| 2010/0057463 A1 | 3/2010 | Weng et al. |
| 2010/0057801 A1 | 3/2010 | Ramer et al. |
| 2010/0093435 A1 | 4/2010 | Glaser et al. |
| 2010/0121839 A1* | 5/2010 | Meyer ............... G06F 17/30893 707/720 |
| 2010/0138215 A1* | 6/2010 | Williams ................ G10L 15/22 704/9 |
| 2010/0161642 A1* | 6/2010 | Chen ................. G06F 17/30864 707/759 |
| 2010/0169098 A1 | 7/2010 | Patch |
| 2010/0199227 A1 | 8/2010 | Xiao et al. |
| 2010/0205180 A1 | 8/2010 | Cooper et al. |
| 2010/0217604 A1 | 8/2010 | Baldwin et al. |
| 2010/0235341 A1 | 9/2010 | Bennett |
| 2010/0235375 A1 | 9/2010 | Sidhu et al. |
| 2010/0250518 A1* | 9/2010 | Bruno ............... G06F 17/30386 707/718 |
| 2010/0274796 A1 | 10/2010 | Beauregard et al. |
| 2010/0281435 A1 | 11/2010 | Bangalore et al. |
| 2010/0306591 A1* | 12/2010 | Krishna ............ G06F 17/30474 714/35 |
| 2010/0313125 A1 | 12/2010 | Fleizach |
| 2010/0318398 A1* | 12/2010 | Brun et al. ......................... 705/9 |
| 2010/0318549 A1* | 12/2010 | Mayr ..................... G06F 19/322 707/759 |
| 2011/0016005 A1 | 1/2011 | Li et al. |
| 2011/0022992 A1 | 1/2011 | Zhou et al. |
| 2011/0040777 A1 | 2/2011 | Stefanov |
| 2011/0099476 A1 | 4/2011 | Snook et al. |
| 2011/0105190 A1 | 5/2011 | Cha |
| 2011/0137943 A1* | 6/2011 | Asano ........................... 707/780 |
| 2011/0144999 A1* | 6/2011 | Jang et al. ................. 704/270.1 |
| 2011/0219340 A1 | 9/2011 | Pathangay |
| 2011/0313768 A1 | 12/2011 | Klein et al. |
| 2011/0320470 A1 | 12/2011 | Williams et al. |
| 2011/0320945 A1 | 12/2011 | Wong |
| 2012/0030637 A1 | 2/2012 | Dey et al. |
| 2012/0035924 A1 | 2/2012 | Jitkoff et al. |
| 2012/0059842 A1 | 3/2012 | Hille-Doering et al. |
| 2012/0130822 A1 | 5/2012 | Patwa et al. |
| 2012/0131073 A1* | 5/2012 | Olney ........................... 707/822 |
| 2012/0166178 A1* | 6/2012 | Latzina .................. G06F 17/27 704/9 |
| 2012/0216151 A1 | 8/2012 | Sarkar et al. |
| 2012/0242586 A1 | 9/2012 | Krishnaswamy |
| 2012/0253788 A1 | 10/2012 | Heck et al. |
| 2012/0253789 A1 | 10/2012 | Heck et al. |
| 2012/0253790 A1 | 10/2012 | Heck et al. |
| 2012/0253791 A1 | 10/2012 | Heck et al. |
| 2012/0253802 A1 | 10/2012 | Heck et al. |
| 2012/0254227 A1 | 10/2012 | Heck et al. |
| 2012/0254810 A1 | 10/2012 | Heck et al. |
| 2012/0296643 A1 | 11/2012 | Kristjansson et al. |
| 2012/0316862 A1* | 12/2012 | Sultan et al. ..................... 704/4 |
| 2012/0327009 A1 | 12/2012 | Fleizach |
| 2013/0117022 A1 | 5/2013 | Chen et al. |
| 2013/0185081 A1 | 7/2013 | Cheyer et al. |
| 2014/0059030 A1 | 2/2014 | Hakkani-Tur et al. |
| 2015/0127323 A1* | 5/2015 | Jacquet ................. G06F 17/271 704/9 |
| 2016/0004707 A1 | 1/2016 | Hakkani-Tur |
| 2016/0118046 A1 | 4/2016 | Heck et al. |

FOREIGN PATENT DOCUMENTS

| | | |
|---|---|---|
| CN | 1692407 | 11/2005 |
| CN | 1963752 | 10/2006 |
| CN | 1845052 | 5/2007 |
| CN | 1983271 A | 6/2007 |
| CN | 101120341 | 2/2008 |
| CN | 101297355 A | 10/2008 |
| CN | 101499277 | 5/2011 |
| EP | 1 335 338 A2 | 12/2007 |
| JP | 2001125592 | 12/2001 |
| JP | 2002-024285 | 1/2002 |
| JP | 2002-082748 | 3/2002 |
| JP | 2003-505712 | 2/2003 |
| JP | 2003-115951 | 4/2003 |
| JP | 2004212641 | 7/2004 |
| JP | 2004328181 | 11/2004 |
| JP | 2004341672 | 12/2004 |
| JP | 2005-043461 | 2/2005 |
| JP | 2006202159 | 6/2007 |
| JP | 2009205552 | 10/2008 |
| JP | 2010-128665 | 6/2010 |
| JP | 2010519609 | 6/2010 |
| JP | 2010-145262 | 7/2010 |
| JP | 2010-230918 | 10/2010 |
| KR | 1020050032649 | 4/2005 |
| KR | 10-1007336 B1 | 1/2011 |
| KR | 10-2011-0066357 | 6/2011 |
| TW | 504624 B | 10/2002 |
| WO | WO 00/73900 A1 | 12/2000 |
| WO | WO 00/75808 A1 | 12/2000 |
| WO | WO 2007/064482 A1 | 6/2007 |
| WO | 2008/049206 A1 | 5/2008 |
| WO | WO 2008/069519 | 6/2008 |
| WO | WO 2009/059065 | 5/2009 |

OTHER PUBLICATIONS

International Search Report & Written Opinion in PCT/US2012/031736 dated Oct. 31, 2012.

International Search Report & Written Opinion in PCT/US2012/030730 dated Oct. 30, 2012.

International Search Report & Written Opinion in PCT/US2012/030636 dated Oct. 31, 2012.

International Search Report & Written Opinion in PCT/US2012/030740 dated Nov. 1, 2012.

International Search Report & Written Opinion in PCT/US2012/030757 dated Nov. 1, 2012.

International Search Report & Written Opinion in PCT/US2012/030751 dated Sep. 5, 2012.

Tur, et al., "Sentence Simplification for Spoken Language Understanding", In Proceedings of International Conference on Acoustics, Speech and Signal Processing, May 22, 2011, 4 pages.

Hakkani-Tur, et al., "Mining Search Query Logs for Spoken Language Understanding", In Workshop on Future Directions and Needs in the Spoken Dialog Community: Tools and Data, Jun. 7, 2012, pp. 37-40.

Riezler, et al., "Query Rewriting Using Monolingual Statistical Machine Translation", In Journal of Computational Linguistics Archive, vol. 36, Issue 3, Sep. 2010, pp. 569-582.

Agichtein, et al., "Improving Web Search Ranking by Incorporating User Behavior Information", In Proceedings of the 29th Annual International ACM SIGIR Conference on Research and Development in Information Retrieval, Aug. 6, 2006, 8 pgs.

Hakkani-Tur, et al., "Exploiting Query Click Logs for Utterance Domain Detection in Spoken Language Understanding", In Proceedings of International Conference on Acoustics, Speech and Signal Processing, May 22, 2011, 4 pages.

(56) References Cited

OTHER PUBLICATIONS

Hakkani-Tur, et al., "Employing Web Search Query Click Logs for Multi-Domain Spoken Language Understanding", In Proceedings of IEEE Workshop on Automatic Speech Recognition and Understanding, Dec. 11, 2011, 6 pgs.
Jung, J. Jason, "Ontology-based context Synchronization for an ad hoc social collaborations," Knowledge-Based Systems, vol. 21, 2008, pp. 573-580.
Kok, et al., "Hitting the Right Paraphrases in Good Time", In Proceedings of Human Language Technologies: The Annual Conference of the North American Chapter of the Association for Computational Linguistics, Jun. 2010, 9 pgs.
Koehn, et al., "Moses: Open Source Toolkit for Statistical Machine Translation", In Proceedings of the Annual Meeting of the Association for Computational Linguistics, Demonstration and Poster Session, Jun. 2007, 4 pages.
Och, et al., "A Systematic Comparison of Various Statistical Alignment Models", In Journal of Computational Linguistics, vol. 29, Issue 1, Mar. 2003, 33 pages.
Tur, et al., "Model Adaptation for Dialog Act Tagging", In Proceedings of IEEE Spoken Language Technology Workshop, Dec. 10, 2006, 4 pages.
Haffner, et al., "Optimizing SVMS for Complex Call Classification", In Proceedings of IEEE International Conference on Acoustics, Speech, and Signal Processing, Apr. 6, 2003, 4 pages.
Mittal, et al., "A Hybrid Approach of Personalized Web Information Retrieval." Proceedings of the 2010 IEEE/WIC/ACM International Conference on Web Intelligence and Intelligent Agent Technology, Aug. 31, 2010, vol. 1, pp. 308-313.
D. Hakkani-Tur, G. Tur, L. Heck, and E. Shriberg, "Bootstrapping Domain Detection Using Query Click Logs for New Domains," in Proceedings of Interspeech, Florence, Italy, 2011.
D. Hillard, A. Celikyilmaz, D. Hakkani-Tur, and G. Tur, "Learning Weighted Entity Lists from Web Click Logs for Spoken Language Understanding," in Proceedings of Interspeech, Florence, Italy, 2011.
A. Celikyilmaz, D. Hakkani-Tur, and G. Tur, "Approximate Interference for Domain Detection in Spoken Language Understanding," in Proceedings of Interspeech, Florence, Italy, 2011.
U.S. Patent Application entitled "Translating Natural Language Utterances to Keyword Search Queries" having U.S. Appl. No. 13/592,638, filed Aug. 23, 2012.
U.S. Official Action dated Aug. 24, 2012, in U.S. Appl. No. 13/077,431.
U.S. Official Action dated May 29, 2013, in U.S. Appl. No. 13/077,303.
U.S. Official Action dated Jun. 4, 2013, in U.S. Appl. No. 13/077,368.
U.S. Restriction Requirement mailed Nov. 2, 2012, in U.S. Appl. No. 13/077,368.
"International Search Report & Written Opinion for PCT Patent Application No. PCT/US2013/055232", Mailed Date: Nov. 18, 2013, Filed Date: Aug. 16, 2013, 10 Pages.
G. Tur and R. D. Mori, Eds., Spoken Language Understanding: Systems for Extracting Semantic Information from Speech. New York, NY: John Wiley and Sons, 2011, 484 pgs.
U.S. Official Action dated Dec. 24, 2013 in U.S. Appl. No. 13/592,638.
U.S. Official Action dated Jan. 7, 2014, in U.S. Appl. No. 13/077,303.
Senior, et al., article entitled "Augmenting Conversational Dialogue by Means of Latent Semantic Googling,"—Published Date: Oct. 4-6, 2005, Trento, Italy; 7 pages, http://www.hml.queensu.ca/files/po265-senior.pdf.
Wang, et al., article entitled "Idea Expander: Agent-Augmented Online Brainstorming,"—Published Date: Feb. 6-10, 2010, Savannah, Georgia; 2 pages, http://research.microsoft.com/en-us/um/redmond/groups/connect/cscw_10/docs/p535.pdf.
Lyons, et al., article entitled "Augmenting Conversations Using Dual-Purpose Speech,"—Published Date: 2004; College of Computing and GVU Center, Georgia Institute of Technology, Atlanta, Georgia; 10 pages. http://www.cc.gatech.edu/ccg/publications/dp-uist.pdf.
Sherwani, et al., article entitled "VoicePedia: Towards Speech-based Access to Unstructured Information,"—Published Date: 2007; 4 pages http://www.cs.cmu.edu/~jsherwan/pubs/voicepedia.pdf.
Website: The Future of Voice Arrives—Published Date: Jan. 11, 2007; 2 pages http://www.voicebox.com/technology/.
Mairesse, et al., article entitled Learning to Personalize Spoken Generation for Dialogue Systems—Published Date: 2005; 4 pages. http://citeseerx.ist.psu.edu/viewdoc/download?doi=10.1.1.66.9988&rep=rep1&type=pdf.
Nguyen, et al., article entitled "An Adaptive Plan Based Dialogue Agent: Integrating Learning into a BDI Architecture," Published Date: May 8-12, 2006 at AAMASA '06 in Hakodate, Hokkaido, Japan; 3 pages. http://www.cse.unsw.edu.au/~wobcke/papers/adaptive-dialogue.pdf.
Website: Fully automated conversation dialog systems, Published Date: Jun. 10, 2008; 2 pages. http://www.gyruslogic.com/.
Technical Whitepaper entitled "Speak With Me, Inc." Retrieved Date: Sep. 24, 2010; 11 pages. http://www.speakwithme.com/files/pdf/whitepaper.pdf.
Castells, et al., article entitled "Scalable semantic personalized search of spoken and written contents on the Semantic Web,A" Published Date: 2005; 12 pages. http://webcache.googleusercontent.com/search?q=cache:http://ir.ii.uam.es/s5t/informes/TIN2005-06885.pdf.
Marcialis, et al., article entitled "SEARCHY: An Agent to Personalize Search Results," Published Date: Jun. 20, 2008 at the IEEE Third International Conference on Internet and Web Applications and Services Conference; 6 pages. http://ieeexplore.ieee.org/stamp/stamp.jsp?tp=&arnumber=4545664.
Tomuro et al., article entitled "Personalized Search in Folksonomies with Ontological User Profiles," Retrieved Date: Sep. 30, 2010; 14 pages. http://facweb.cs.depaul.edu/noriko/papers/iis09.pdf.
Mylonas et al., article entitled "Personalized information retrieval based on context and ontological knowledge," Retrieved Date: Sep. 30, 2010. Printed in the United Kingdom and Presented in the Knowledge Engineering Review, vol. 23:1, 73-100; 2007, Cambridge University Press, 28 pages. http://citeseerx.ist.psu.edu/viewdoc/download?doi=10.1.1.148.4272&rep=rep1&type=pdf.
Abstract entitled "Adding Intelligence to the Interface," Published Date: 1996 IEEE; 12 pages. http://www.hitl.washington.edu/publications/billinghurst/vrais96.
Turunen et al. article entitled "Multimodal Interaction with Speech and Physical Touch Interface in a Media Center Application," Presented and Published Oct. 29-31, 2009 at Ace 2009 in Athens, Greece; 8 pages. http://delivery.acm.org/10.1145/1700000/1690392/p19-turunen.pdf?key1=1690392&key2=5824375821&coll=GUIDE&dl=GUIDE&CFID=103676711&CFTOKEN=24231502.
Moustakas et al., article entitled "Master-Piece: A Multimodal (Gesture+Speech) Interface for 3D Model Search and Retrieval Integrated in a Virtual Assembly Application," Presented and Published Jul. 18-Aug. 12, 2005 at Enterface '05 in Mons, Belgium; 14 pages. http://www.enterface.net/enterface05/docs/results/reports/project7.pdf.
Lee e al., article entitled "An Implementation of Multi-Modal Game Interface Based on PDAs," Published Date: Aug. 2007 at the IEEE Fifth International Conference on Software Engineering Research, Management and Applications; 8 pages. http://ieeexplore.ieee.org/stamp/stamp.jsp?tp=&arnumber=4297013.
Mark Billinghurst, article entitled "Put That Where? Voice and Gesture at the Graphics Interface," Published in the Nov. 1998 Computer Graphics, 5 pages. http://delivery.acm.org/10.1145/310000/307730/p60-billinghurst.pdf?key1=307730&key2=0278375821&coll=GUIDE&dl=GUIDE&CFID=103683245&CFTOKEN=90378528.
Stegmann, et al., abstract entitled "Multimodal Interaction for Access to Media Content," Retrieved Date: Sep. 29, 2010; 4 pages. http://www.icin.biz/files/2008papers/Poster-08.pdf.
Horiguchi et al., abstract entitled "GaChat: A chat system that displays online retrieval information in dialogue text," Published at

(56) References Cited

OTHER PUBLICATIONS the Workshop on Visual Interfaces to the Social and the Semantic Web Conference Feb. 8, 2009 in Sanibel Island, Florida; 5 pages. http://www.smart-ui.org/events/vissw2009/papers/VISSW2009-Horiguchi.pdf.
Aye, et al., article entitled "Use of Ontologies for Bridging Semantic Gaps in Distant Communication," Published Date: 2008; 5 pages. http://ieeexplore.ieee.org/stamp/stamp.jsp?jp=&arnumber=4781725.
Jebara et al., article entitled "Tracking Conversational Context for Machine Mediation of Human Discourse," Retrieved Date: Oct. 1, 2010; 3 pages. http://www.cs.columbia.edu/~jebara/papers/conversation.pdf.
Power Point Presentation entitled "Spoken Language Understanding for Conversational Dialog Systems," Presented and published at the IEEE/ACL 2006 Workshop on Spoken Language Technology in Aruba, Dec. 10-13, 2006; 33 pages. http://www.slt2006.org/MichaelMcTear.ppt.
Fabbrizio et al., abstract entitled "Bootstrapping Spoken Dialog Systems with Data Reuse," Retrieved Date: Oct. 12, 2010; 9 pages. http://www.sigdial.org/workshops/workshop5/proceedings/pdf/difabbrizio.pdf.
Website: Siri: Your Personal Assistant for the Mobile Web—Published Date: Feb. 4, 2010; 3 pages. http://www.readwriteweb.com/archives/siri_your_personal_assistant_for_the_mobile_web.php.
Abela, et al., abstract entitled "SemChat: Extracting Personal Information from Chat Conversations," Retrieved Date: Oct. 12, 2010; 10 pages. http://staff.um.edu.mt/cabe2/supervising/undergraduate/overview/keith_cortis.pdf.
Robert Brown, article entitled "Exploring New Speech Recognition and Synthesis APIs in Windows Vista," published in MSDN Magazine, Retrieved Date: Oct. 12, 2010; 11 pages. http://msdn.microsoft.com/en-us/magazine/cc163663.aspx.
Brody, et al., Body language user interface (BLUI), http://adsabs.harvard.edu/abs/1998SPIE.3299..400B, accessed Aug. 17, 2009, 1 page.
Corominas, Aurora, "The Artist's Gesture. An initial approach to the cinematic representation of Vincent Van Gogh's pictorial practice", http://www.iua.upf.es/formats/formats3/cor_a.htm, accessed Aug. 17, 2009, 12 pages.
Gao et al., "VS: Facial Sculpting in the Virtual World", International Conference on Computational Intelligence for Modeling Control and Automation, and International Conference on Intelligent Agents, Web Technologies and Internet Commerce (CIMCA-IAWTIC'06), IEEE Computer Society, Aug. 17, 2009, 6 pages.
Hauptmann, "Speech and Gestures for Graphic Image Manipulation", CHI'89 Proceedings, Department of Computer Science, Carnegie-Mellon University, Pittsburgh, Penn., May 1989, 20(SI), 241-245.
Qian et al., "A Gesture-Driven Multimodal Interactive Dance System", IEEE International Conference on Multimedia and Expo, Taipei, Jun. 2004, vol. 3, pp. 1579-1582.
Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, pp. 260-267.
U.S. Patent Application entitled "Augmented Conversational Understanding Agent" having U.S. Appl. No. 13/076,862, filed Mar. 31, 2011.
U.S. Patent Application entitled "Conversational Dialog Learning and Correction" having U.S. Appl. No. 13/077,233, filed Mar. 31, 2011.
U.S. Patent Application entitled "Personalization of Queries, Conversations, and Searches" having U.S. Appl. No. 13/077,303, filed Mar. 31, 2011.
U.S. Patent Application entitled "Combined Activation for Natural User Interface Systems" having U.S. Appl. No. 13/077,368, filed Mar. 31, 2011.
U.S. Patent Application entitled "Task Driven User Intents" having U.S. Appl. No. 13/077,396, filed Mar. 31, 2011.
U.S. Patent Application entitled "Augmented Conversational Understanding Architecture" having U.S. Appl. No. 13/077,431, filed Mar. 31, 2011.
U.S. Patent Application entitled "Location-Based Conversational Understanding" having U.S. Appl. No. 13/077,455, filed Mar. 31, 2011.
U.S. Patent Application entitled "Decorating a Display Environment" having U.S. Appl. No. 12/604,526, filed Oct. 23, 2009.
U.S. Official Action dated May 10, 2012 in U.S. Appl. No. 12/604,526.
Lee, et al. Abstract entitled "Simplification of Nomenclature Leads to an Ideal IL for Human Language Communication"—Published Date: Oct. 28, 1997, at the AMTA/SIG-IL First Workshop on Interlinguas, San Diego, CA., Oct. 28, 1997; pp. 71-72; 2 pgs. Obtained at: http://www.mt-archive.info/AMTA-1997-Lee.pdf.
Kuansan Wang, Abstract entitled "Semantics Synchronous Understanding for Robust Spoken Language Applications"—Published Date: 2003, pp. 640-645; 6 pgs. Obtained at: http://research.microsoft.com/pubs/77494/2003-kuansan-asru.pdf.
Antoine, et al., Abstract entitled "Automatic Adaptive Understanding of Spoken Language by Cooperation of Syntactic Parsing and Semantic Priming"—Published Date: 1994; 5 pgs. Obtained at: http://www-clips.imag.fr/geod/User/jean.caelen/Publis_fichiers/SyntaxeSemantique.pdf.
Tur, et al., Abstract entitled "Semi-Supervised Learning for Spoken Language Understanding Using Semantic Role Labeling"—Published Date: 2005, pp. 232-237; 6 pgs. Obtained at: http://ieeexplore.ieee.org/stamp/stamp.jsp?arnumber=01566523.
Finkel, et al., Abstract entitled "Incorporating Non-Local Information into Information Extraction Systems by Gibbs Sampling"—Published Date: Jan. 3, 2006, 8 pgs. Obtained at: http://nlp.stanford.edu/~manning/papers/gibbscrf3.pdf.
Wang, et al, Article entitled "An Introduction to the Statistical Spoken Language Understanding"—Published in the IEEE Signal Processing Magazine, vol. 22, No. 5, pp. 16-31; 2005. http://research.microsoft.com/pubs/75236/2005-Wang-Deng-Acero-SMP.pdf.
Gorin, et al., Abstract entitled "How May I Help You?" Published in Speech Communication 23, Feb. 14, 1997, Revised May 23, 1997; pp. 113-127, 14 pgs. http://disi.unitn.it/~riccardi/papers/specom97.pdf.
P. J. Price, Abstract entitled "Evaluation of Spoken Language Systems: The ATIS Domain" Obtained on May 12, 2011, 5 pgs. from the following website: http://acl.ldc.upenn.edu/H/H90/H90-1020.pdf.
Raymond, et al, Abstract entitled "Generative and Discriminative Algorithms for Spoken Language Understanding", Published Aug. 27-31, 2007 at the Interspeech 2007 Conference in Antwerp, Belgium; pp. 1605-1608, 4 pgs. Obtain at: http://citeseerx.ist.psu.edu/viewdoc/download?doi=10.1.1.106.2105&rep=rep1&type=pdf.
Jeong, et al., Abstract entitled "Exploiting Non-Local Features for Spoken Language Understanding" Published in the Proceedings of the COLING/ACL 2006 Main Conference Poster Sessions, pp. 412-419 in Sydney, Australia Jul. 2006; 8 pgs. Obtain at: http://www.aclweb.org/anthology/P/P06/P06-2054.pdf.
Moschitti, et al., Abstract entitled "Spoken Language Understanding with Kernels for Syntactic/Semantic Structures" Published in the 2007 IEEE Proceedings, pp. 183-188; 6 pgs. Obtained at: http://ieeexplore.ieee.org/stamp/stamp.jsp?tp=&arnumber=4430106.
Hakkani-?Tur, et al. Abstract entitled "Using Semantic and Syntactic Graphs for Call Classification" Published in the Proceedings of the ACL Workshop on Feature Engineering for Machine Learingin in NLP, pp. 24-31 in Ann Arbor, Michigan, Jun. 2005; 8 pgs. Obtained at: http://citeseerx.ist.psu.edu/viewdoc/download?doi=10.1.1.59.8566&rep=rep1&type=pdf.
Dowding, et al. Article entitled "Gemini: A Natural Language System for Spoken Language Understanding" pp. 54-61; 8 pgs. Obtained on May 12, 2011 at website: http://acl.ldc.upenn.edu/P/P93/P93-1008.pdf.

(56) References Cited

OTHER PUBLICATIONS

Stephanie Seneff. Article entitled "TINA: A Natural Language System for Spoken Language Applications" Published in the 1992 Edition of Association for Computational Linguistics, vol. 18, No. 1, pp. 61-86; 26 pgs. Obtained at: http://citeseerx.ist.psu.edu/viewdoc/download?doi=10.1.1.75.1626&rep=rep1&type=pdf.

Ward, et al. Abstract entitled "Recent Improvements in the CMU Spoken Language Understanding System." 4 pgs. Obtained on May 12, 2011 at website: http://www.aclweb.org/anthology/H/H94/H94-1039.pdf.

Vickrey, et al. Abstract entitled "Sentence Simplification for Semantic Role Labeling." 9 pgs. Obtained on May 12, 2011 at website: http://ai.stanford.edu/~dvickrey/underlying.pdf.

Vanderwende, et al. Abstract entitled "Microsoft Research at DUC2006: Task-Focused Summarization with Sentence Simplification and Lexical Expansion." 8 pgs. Obtained on May 12, 2011 at website: http://citeseerx.ist.psu.edu/viewdoc/download?doi=10.1.1.114.2486&rep=rep1&type=pdf.

Petrov et al., Abstract entitled "Learning and Inference for Hierarchically Split PCFGs" Published in 2007 in cooperation with the Association for the Advancement of Artificial Intelligence. 4 pgs. Obtained at: http://www.petrovi.de/data/aaai07.pdf.

Schapire, et al. Abstract entitled "BoosTexter: A Boosting-Based System for Text Categorization," 34 pgs. Obtaining May 12, 2011 at website: http://citeseerx.ist.psu.edu/viewdoc/download?doi=10.1.1.33.1666&rep=rep1&type=pdf.

He, et al. Abstract entitled "A Data-Driven Spoken Language Understanding System." 6 pgs. Obtained on May 12, 2011 at website: http://citeseerx.ist.psu.edu/viewdoc/download?doi=10.1.1.141.5688&rep=rep1&type=pdf.

Yaman, et al., Article entitled "An Integrative and Discriminative Technique for Spoken Utterance Classification," Published in the IEEE Transactions on Audio, Speech, and Language Processing Magazine, vol. 16, No. 6, Aug. 2008. pp. 1207-1214; 8 pgs. http://research.microsoft.com/pubs/73918/sibel.pdf.

Gillick, et al. Article entitled "Some Statistical Issues in the Comparison of Speech Recognition Algorithms." Published in the Proceedings at the IEEE Conference on Acoustics, Speech and Sig. Proc., Glasglow, 1989; pp. 532-535; 4pgs. http://citeseerx.ist.psu.edu/viewdoc/download?doi=10.1.1.162.2233&rep=rep1&type=pdf.

Tur, et al., Abstract entitled "What is Left to be Understood in ATIS?" Published in the Proceedings of the IEEE SLT Workshop in Berkeley, CA., 2010. (not readily available on any website); 6 pgs.

U.S. Official Action dated Jan. 28, 2014, in U.S. Appl. No. 13/077,455, 27 pgs.

U.S. Official Action dated Feb. 24, 2014, in U.S. Appl. No. 13/077,396, 50 pgs.

U.S. Official Action dated Feb. 28, 2014, in U.S. Appl. No. 13/077,233, 53 pgs.

Richard A. Bolt, "Put-That-There": Voice and Gesture at the Graphics Interface, Architecture Machine Group, MIT, 1980, 9 pgs.

U.S. Official Action dated Sep. 5, 2014, in U.S. Appl. No. 13/077,431, 38 pgs.

U.S. Official Action dated Sep. 15, 2014, in U.S. Appl. No. 13/077,368, 12 pgs.

U.S. Official Action dated Oct. 10, 2014, in U.S. Appl. No. 13/077,233, 51 pgs.

U.S. Official Action dated Oct. 29, 2014, in U.S. Appl. No. 13/077,455, 27 pgs.

U.S. Official Action dated Nov. 3, 2014, in U.S. Appl. No. 13/077,303, 28 pgs.

U.S. Official Action dated Nov. 19, 2014, in U.S. Appl. No. 13/077,396, 55 pgs.

EP Communication dated Apr. 20, 2015 in Application No. PCT/US2012/030636, 8 pgs.

EP Supplementary Search Report Received for European Patent Application No. PCT/US2012/031736, Mailed Date: May 11, 2015, 10 Pages.

EP Search Report Issued in European Patent Application No. PCT/US2012/030730, Mailed Date: May 11, 2015, 9 Pages.

EP Supplementary Search Report Issued in European Patent Application No. PCT/US2012/031722, Mailed Date: May 11, 2015, 11 Pages.

EP Search Report Received for European Patent Application No. 12765896.1, Mailed Date: May 28, 2015, 12 Pages.

Díaz et al., "CO-Pretégé: A Groupware Tool for Supporting Collaborative Ontology Design with Divergence"; alicia.diaz@sol.info.unlp.edu.ar; Jul. 18, 2005; [retrieved Mar. 26, 2015]; 4 pgs.

Hu, et al., "SmartContext: An Ontology Based Context Model for Cooperative Mobile Learning", In Computer Supported Cooperative Work in Design III, May 3, 2006, pp. 717-726.

Siebra, et al., "SmartChat—An Intelligent Environment for Collaborative Discussions", In Proceedings of 7th International Conference on Intelligent Tutoring Systems, Aug. 30, 2004, pp. 883-885.

Cozzolongo, et al., "Personalized Control of Smart Environments", In Lecture Notes in Computer Science, vol. 4511, Jul. 25, 2007, 5 Pages.

Nijholt, et al., "Google Home: Experience, Support and Re-Experience of Social Home Activities", In Information Sciences, vol. 178, Issue 3, Nov. 6, 2007, 19 Pages.

Pissinou, et al., "A Roadmap to the Utilization of Intelligent Information Agents: Are Intelligent Agents the Link Between the Database and Artificial Intelligence Communities?", In IEEE Knowledge and Data Engineering Exchange Workshop, Jan. 1, 1997, 10 Pages.

Notice of Allowance dated Dec. 3, 2014 in U.S. Appl. No. 13/592,638, 23 pgs.

Notice of Allowance dated Feb. 17, 2015 in U.S. Appl. No. 13/592,638, 12 pgs.

U.S. Official Action dated Mar. 19, 2015, in U.S. Appl. No. 13/077,431, 24 pgs.

U.S. Official Action dated Apr. 9, 2015, in U.S. Appl. No. 13/077,368, 18 pgs.

U.S. Official Action dated May 5, 2015, in U.S. Appl. No. 13/077,455, 14 pgs.

U.S. Patent Application entitled "Translating Natural Language Utterances to Keyword Search Queries" having U.S. Appl. No. 14/733,188, filed Jun. 8, 2015.

U.S. Official Action dated Jun. 4, 2015, in U.S. Appl. No. 13/077,396, 35 pgs.

U.S. Official Action dated Jun. 12, 2015, in U.S. Appl. No. 13/077,303, 25 pgs.

U.S. Official Action dated Jul. 1, 2015 in U.S. Appl. No. 13/076,862, 60 pgs.

EP Extended Search Report Received for European Patent Application No. 12763913.6, Mailed Date: Sep. 1, 2015, 13 pgs.

Klusch; "Information Agent Technology for the Internet: A Survey"; Data & Knowledge Engineering; vol. 36, Mar. 1 2001, 36 pgs.

Panton et al., "Common Sense Reasoning—From Cyc to Intelligent Assistant"; Cycorp, Inc.; Jan. 1, 2006; Ambient Intelligence in Everyday Life Lecture Notes in Computer Science; 32 pgs.

Kolski et al., "A Review of Intelligent Human-Machine Interfaces in the Light of the ARCH Model"; Published online Nov. 13, 2009; International Journal of Human-Computer Interaction; vol. 10, No. 3; Sep. 1, 1998.

Japanese Office Action in Application 2014-502721, mailed Mar. 3, 2016, 10 pgs.

U.S. Appl. No. 13/077,233, Office Action mailed Apr. 18, 2016, 36 pgs.

U.S. Appl. No. 13/077,303, Advisory Action mailed Apr. 15, 2016, 3 pgs.

Notice of Allowance dated Dec. 18, 2015, in U.S. Appl. No. 13/077,455, 2 pgs.

Notice of Allowance dated Dec. 3, 2015, in U.S. Appl. No. 13/077,455, 2 pgs.

U.S. Patent Application entitled "Location-Based Conversational Understanding" having U.S. Appl. No. 14/989,974, filed Jan. 7, 2016.

Taiwan Search Report Issued in Patent Application No. 101105673, Mailed Date: Oct. 16, 2015, 9 pgs.

(56) References Cited

OTHER PUBLICATIONS

Chinese Office Action and Search Report Issued in Patent Application No. 201210092263.0, Mailed Date: Dec. 10, 2015, 15 pgs.
Chinese Office Action and Search Report Issued in Patent Application No. 201210101485.4, Mailed Date: Dec. 11, 2015, 14 pgs.
Taiwan Notice of Allowance Issued in Patent Application No. 101105673, Mailed Date: Mar. 2, 2016, 4 pgs.
Notice of Allowance dated Sep. 18, 2015, in U.S. Appl. No. 13/077,455, 22 pgs.
Notice of Allowance dated Oct. 7, 2015, in U.S. Appl. No. 13/077,368, 24 pgs.
U.S. Official Action dated Nov. 27, 2015, in U.S. Appl. No. 13/077,431, 15 pgs.
U.S. Official Action dated Dec. 4, 2015, in U.S. Appl. No. 13/077,396, 45 pgs.
U.S. Official Action dated Dec. 7, 2015, in U.S. Appl. No. 13/077,303, 32 pgs.
U.S. Official Action dated Jan. 14, 2016 in U.S. Appl. No. 13/076,862, 44 pgs.
U.S. Official Action dated Jun. 26, 2014, in U.S. Appl. No. 13/077,455, 26 pgs.
U.S. Official Action dated Jul. 10, 2014, in U.S. Appl. No. 13/077,303, 31 pgs.
U.S. Official Action dated Mar. 20, 2014 in U.S. Appl. No. 13/076,862, 35 pgs.
U.S. Official Action dated Mar. 20, 2014, in U.S. Appl. No. 13/077,368, 22 pgs.
U.S. Official Action dated Jun. 11, 2013, in U.S. Appl. No. 13/077,455.
U.S. Official Action dated Jul. 25, 2013 in U.S. Appl. No. 13/077,431.
U.S. Official Action dated Aug. 1, 2013 in U.S. Appl. No. 13/076,862.
U.S. Appl. No. 13/077,396, Office Action mailed May 19, 2016, 36 pgs.
U.S. Appl. No. 13/077,303, Office Action mailed May 3, 2016, 19 pgs.
Chinese Office Action in Application 201210087420.9, mailed May 5, 2016, 18 pgs.
U.S. Appl. No. 13/077,431, Office Action mailed Jun. 29, 2016, 16 pgs.
Japanese Office Action in Application 2014-502723, mailed Apr. 27, 2016, 7 pages.
Japanese Office Action in Application 2014-502718, mailed May 20, 2016, 9 pages.
Chinese Office Action in Application 201210093414.4, mailed Jun. 3, 2016, 16 pages.
Chinese Office Action in Application 2012100911763, mailed May 25, 2016, 14 pages.
Chinese Office Action in Application 201210090349, mailed Jun. 15, 2016, 13 pages.
Chinese Office Action in Application 201210090634.1, mailed Jun. 30, 2016, 10 pgs.

* cited by examiner

US 9,454,962 B2

SENTENCE SIMPLIFICATION FOR SPOKEN LANGUAGE UNDERSTANDING

BACKGROUND

Sentence simplification is a process for improving the robustness of spoken language understanding tasks. In conventional systems, simple well-formed sentences may be converted accurately, but the error rate increases as the sentences become more complex. For example, longer, natural, and/or spontaneous utterances often prove difficult to convert and result in inaccurate processing. In some situations, the speaker's intent may be reversed by a negation. Conventional systems depend on word n-grams where n is less than 5; that is, such systems cannot discern intent changes when the changing word is more than five words away in the original sentence.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Sentence simplification may be provided. A spoken phrase may be received and converted to a text phrase. An intent associated with the text phrase may be identified. The text phrase may then be reformatted according to the identified intent and a task may be performed according to the reformatted text phrase.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
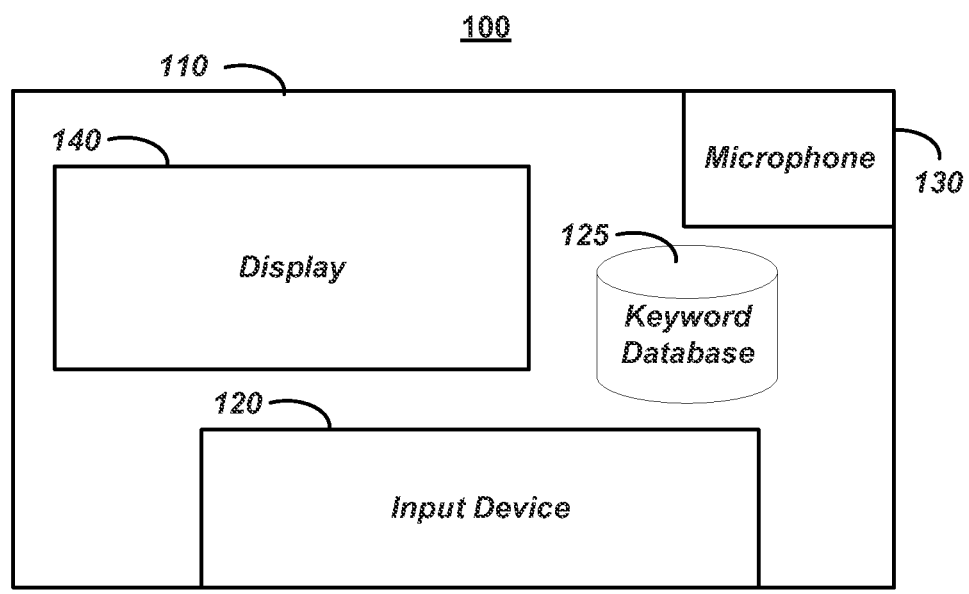
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Sentence simplification for spoken language understanding (SLU) may be provided. Consistent with embodiments of the present invention, a dependency parsing-based sentence simplification approach may extract a set of keywords from natural language sentences. Those keywords may be used in association with the complete sentences in order to improve the accuracy of SLU tasks.

Speech-to-text conversion (i.e., speech recognition) may comprise converting a spoken phrase into a text phrase that may be processed by a computing system. Acoustic modeling and/or language modeling may be used in modern statistic-based speech recognition algorithms. Hidden Markov models (HMMs) are widely used in many conventional systems. HMMs may comprise statistical models that may output a sequence of symbols or quantities. HMMs may be used in speech recognition because a speech signal may be viewed as a piecewise stationary signal or a short-time stationary signal. In a short-time (e.g., 10 milliseconds), speech may be approximated as a stationary process.

Syntactic information may be used to preprocess spoken language inputs and prepare the feature set for SLU tasks. This may assist in alleviating the problem that paths in a parse tree may occur a relatively small number of times. A simple negation, for example, may totally change the structure of the syntactic parse tree. Sentence simplification may then help this problem by condensing the training and test sets so that the classifier will work better as the average frequency of candidate lexical and syntactic features increase.

Further, long distance dependencies may be better handled without bombarding the classifier with candidate syntactic features. Sentence simplification may thus comprise an utterance compression task with a goal of rephrasing the same intent with fewer words and supporting short, keyword sequence inputs. This may be analogous to understanding keyword-based queries where there is usually a natural language query in mind. For example the query "What is the capacity of a 737" may be rephrased as "capacity 737".

While sentence simplification makes sense for intent determination, which is typically framed as an utterance classification task, this approach may also be effective for slot filling due to its power for handling long distance dependencies. For both tasks, the approach may rely on features extracted from the dependency parse of the input utterance.

FIG. 1 is a block diagram of an operating environment 100. Operating environment 100 may comprise, for example, a user device 110 such as a computer, laptop, tablet, cellular phone, and/or other electronic device. User device 110 may comprise an input device 120 (e.g., a keyboard, mouse, and/or touch screen), a keyword database 125 stored in a memory, a microphone 130, and a display 140.

Figure 2:
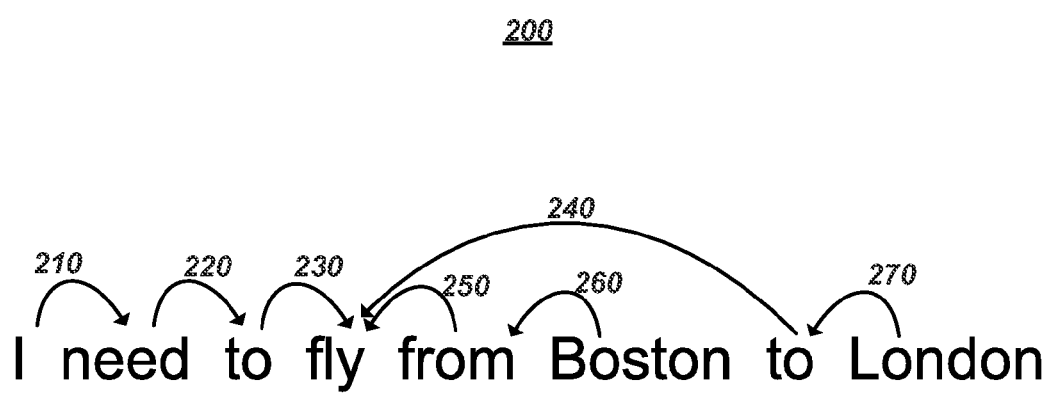
FIG. 2 is an illustration of a dependency parse of an example sentence.

FIG. 2 is an illustration of a dependency parse of an example sentence 200. Example sentence 200 may comprise a plurality of words received via microphone 130, in this case "I need to fly from Boston to London." Each word may comprise a dependency on at least one other word and/or may be associated with at least one other word that depends on it. For example, "I" comprises a first dependency 210 on "need", "need" comprises a second dependency 220 on "to", and "to" comprises a third dependency 230 on "fly". The second "to" may comprise a fourth dependency 240 on "fly"

and "from" may comprise a fifth dependency 250 on "fly". "Boston" may comprise a sixth dependency 260 on "from" and "London" may comprise a seventh dependency 270 on the second "to".

In the example of FIG. 2, "fly" may comprise a top level predicate. The top level predicate may comprise a word on which others depend, but which does not depend on any other words itself. Words that depend on the top level predicate may comprise auxiliary words that may be ancillary to the speaker's intent. For example "I" and "need" may be excluded from the intent determination as auxiliary words as the intended task may be implicitly understood to be associated with something the speaker needs or wants to accomplish. Such auxiliary words may be predefined, such as in keyword database 125. Prepositions such as "from" and/or "to" may be retained as they may be salient to identifying the user's intent. For example, "I need to fly from Boston to London" may comprise an identified intent of booking a flight based on a reformatted instruction phrase of "fly from to" while "How much does it cost to fly from Boston to London" may comprise an identified intent of looking up a fare based on a reformatted instruction phrase of "cost to fly."

Figure 3:
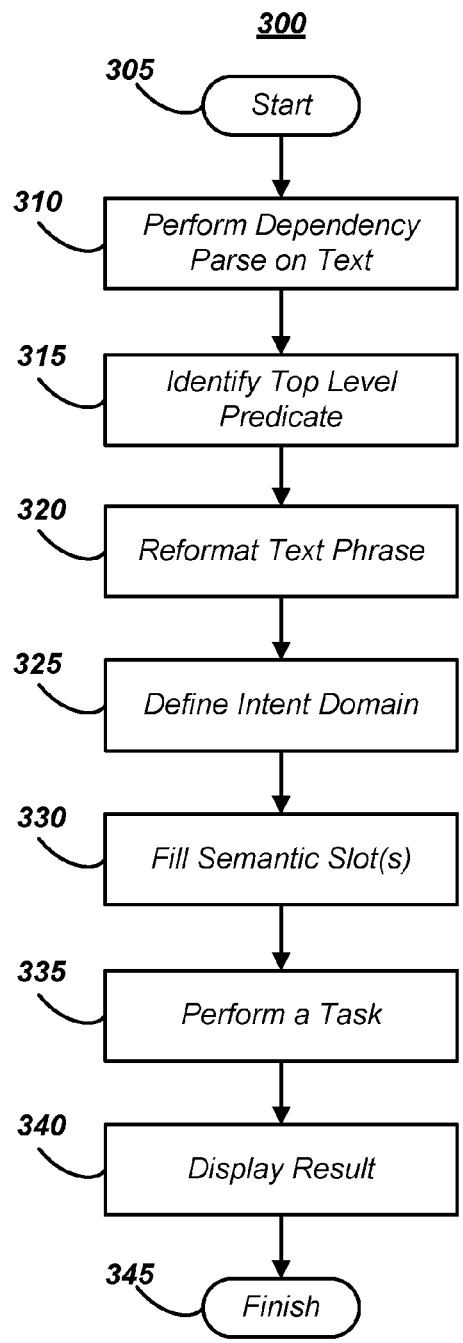
FIG. 3 is a flow chart of a method for providing sentence simplification.

FIG. 3 is a flow chart setting forth the general stages involved in a method 300 consistent with an embodiment of the invention for providing sentence simplification. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may perform a dependency parse on a text phrase. For example, the text phrase "I need to fly from Boston to London" may be parsed such that each word of the phrase depends on and/or is depended upon by at least one other word of the phrase. Consistent with embodiments of the invention, the text phrase may comprise a spoken phrase received from a user and converted to text.

The structure of a sentence may determined by the relation between a word (a head) and its dependents. Each word may point to a head; for example, for the noun phrase "blue book", blue points to book. A parser may be trained from a treebank following a latent variable approach by iteratively splitting non-terminals to better represent the data. A Constituency-to-Dependency Conversion toolkit may be used to form dependency parses from the output parse trees. To adapt the parser to the speech domain, a self-training approach using a training data set, such as the Airline Travel Information System (ATIS) project data set, may be used. The ATIS data set is described in "Evaluation of spoken language systems: The ATIS domain," by P. J. Price as published in Proceedings of the DARPA Workshop on Speech and Natural Language, Hidden Valley, Pa., June 1990, which is hereby incorporated by reference in its entirety.

From stage 310, method 300 may advance to stage 315 where computing device 400 may identify a top level predicate. The top level predicate may comprise a word of the text phrase upon which other words depend but which does not depend on any other words itself. For example, in the phrase "I need to fly from Boston to London", "fly" may comprise the top level predicate. The top level predicate may thus comprise the critical word to the user's intent.

From stage 315, method 300 may advance to stage 320 where computing device 400 may reformat the text phrase. For example, the natural language text phrase "I need to fly from Boston to London" may be reformatted as "fly to". The text phrase "I want to make a dinner reservation at Mario's for 6 people at 7 o'clock" may be reformatted as "reservation at".

Icsiboost2, an implementation of the AdaBoost.MH algorithm, may be used for intent identification. Boosting is an iterative procedure that builds a new weak learner $h_t$ at each iteration. Each example of the training data set may be assigned a weight. These weights may initialized uniformly and updated on each iteration so that the algorithm focuses on the examples that were wrongly classified on the previous iteration. At the end of the learning process, the weak learners used on each iteration t may be linearly combined to form the classification function shown in Equation 1. $\alpha_t$ may comprise a weight of the weak learner $h_t$ and T comprises the number of iterations of the algorithm.

$$f(x, l) = \sum_{t=1}^{T} \alpha_t h_t(x, l) \quad \text{Equation 1}$$

From stage 320, method 300 may advance to stage 325 where computing device 400 may define an intent domain according to the reformatted phrase. For example, a reformatted text phrase of "fly to" may be associated with a travel domain while "reservation at" may be associated with a dining domain.

From stage 325, method 300 may advance to stage 330 where computing device 400 may fill at least one semantic slot. Each intent domain may be associated with a plurality of semantic slots. For example, a travel domain may comprise slots for departure location, departure time, arrival time, arrival destination, travel method, constraints (e.g., lowest cost, no layovers, etc.). A dining domain may comprise semantic slots for cuisine type, time, party size, reservation needed, relative location (e.g., in walking distance, near a transit station, etc.). The semantic slots may be filled with words from the text phrase and/or implied words. Slots may be filled with words that may have been excluded from the reformatted phrase. For example, the phrase "I need to fly from Boston to London" may result in filling a semantic slot for departure location with "Boston" and a semantic slot for arrival location with "London".

Slot filling may need to handle long distance dependencies between the slot word or phrase and its disambiguator. A disambiguator may comprise a phrase that determines a semantic subcategory of an entity. For example, the word "morning" may be known to be a time period. The semantic disambiguation of whether it is an arrival or departure time within a travel domain intent may rely on a dependent predicate, such as arriving. Similar to intent determination, the slot filler may exploit the phrase dependency structures while determining the semantic slot. It is easy to detect a day name keyword, such as "Saturday," but to understand whether it is departure, arrival, or return day may rely on not only the top level predicate but predicates of other clauses. For the example sentence "Find flights departing from New York tomorrow arriving in Tokyo no later than Saturday," the predicate "arrive" may be considered as a feature while classifying the words which directly or indirectly depend on it (e.g., "Tokyo" and "no later than Saturday"). The recursive algorithm to find the predicate head of a given word may be as follows: if the head of a word is a predicate, then it is used, otherwise, the predicate head of its head is used as its predicate head.

From stage 330, method 300 may advance to stage 335 where computing device 400 may perform a task. For example, the defined domain and semantic slots may be used to perform an Internet search, make dining reservations, purchase airline travel tickets, and/or create a meeting request.

From stage 335, method 300 may advance to stage 340 where computing device 400 may display a result to the user. For example, an original phrase of "I need to fly from Boston to London" may result in searching for airline tickets and displaying a plurality of options such as different airlines, times, and/or prices. Method 300 may then end at stage 345.

An embodiment consistent with the invention may comprise a system for providing sentence simplification. The system may comprise a memory storage and a processing unit coupled to the memory storage. The processing unit may be operative to receive a spoken utterance and/or phrase, convert the spoken phrase to a text phrase, identify an intent—which may be defined by a top level predicate—associated with the text phrase, reformat the text phrase according to the identified intent, and perform a task according to the reformatted text phrase. Being operative to identify the intent associated with the text phrase may comprise being operative to perform a dependency parse on the text phrase such as by identifying a top level predicate and excluding at least one auxiliary word, which may comprise a dependent of the top level predicate, in the text phrase. For example, in the dependency parse of example sentence 200, "Boston" and "London" are auxiliary dependents of "from" and "to", respectively, which are in turn dependents of the top level predicate "fly". "Boston", "London", and "from" may be excluded from the reformatted phrase "fly to". The auxiliary keyword may also comprise a predefined auxiliary keyword such as "need" and/or "want" that may be automatically excluded. Identifying the top level predicate comprises evaluating a statistical weighting criterion associated with each word of the text phrase. For example, "What is the cost to fly from Boston to London" may result in a top level predicate of "cost" while "I need to fly from Boston to London" results in a top level predicate of "fly". Although both phrases comprise the word "fly", in the former example "cost" may comprise a higher statistical weighting indicating that it is more likely to define the user's intent. Reformatting the text phrase according to the identified intent may comprise defining a domain associated with the task and/or filling at least one semantic slot associated with the defined domain.

Another embodiment consistent with the invention may comprise a system for providing sentence simplification. The system may comprise a memory storage and a processing unit coupled to the memory storage. The processing unit may be operative to identify an intent associated with a text phrase, wherein the text phrase comprises a plurality of words, reformat the text phrase according to the identified intent, perform a task according to the reformatted text phrase, and display a result associated with the task to a user. The text phrase may comprise a conversion of a spoken phrase received from the user and may be associated with a search query. Identifying the intent may comprise defining a target domain and the reformatted text phrase may comprise at least one keyword associated with the target domain. The target domain may comprises a plurality of semantic slots and the processing unit may be operative to fill at least one of the semantic slots with at least one slot word of the plurality of words. Filling the at least one of the semantic slots may comprise associating the at least one slot word of the plurality of words with the at least one of the semantic slots according to at least one second word of the plurality of words, wherein the at least one second word may comprise a dependent word associated with the at least one slot word during the dependency parse.

Yet another embodiment consistent with the invention may comprise a system for providing sentence simplification. The system may comprise a memory storage and a processing unit coupled to the memory storage. The processing unit may be operative to receive a spoken phrase from a user, convert the spoken phrase to a text phrase, wherein the text phrase comprises a plurality of words, perform a dependency parse on the text phrase, identify a top level predicate of the text phrase, reformat the text phrase according to the top level predicate, wherein the reformatted text phrase excludes at least one first word of the plurality of words, define an intent domain according to the reformatted text phrase, wherein the defined intent comprises a plurality of semantic slots, fill at least one of the semantic slots with the at least one first word, wherein the at least one first word is associated with the at least one semantic slot according to at least one dependent word of the at least one first word, perform a task according to the defined intent and the filled at least one semantic slot, and display a result of the performed task to the user.

Figure 4:
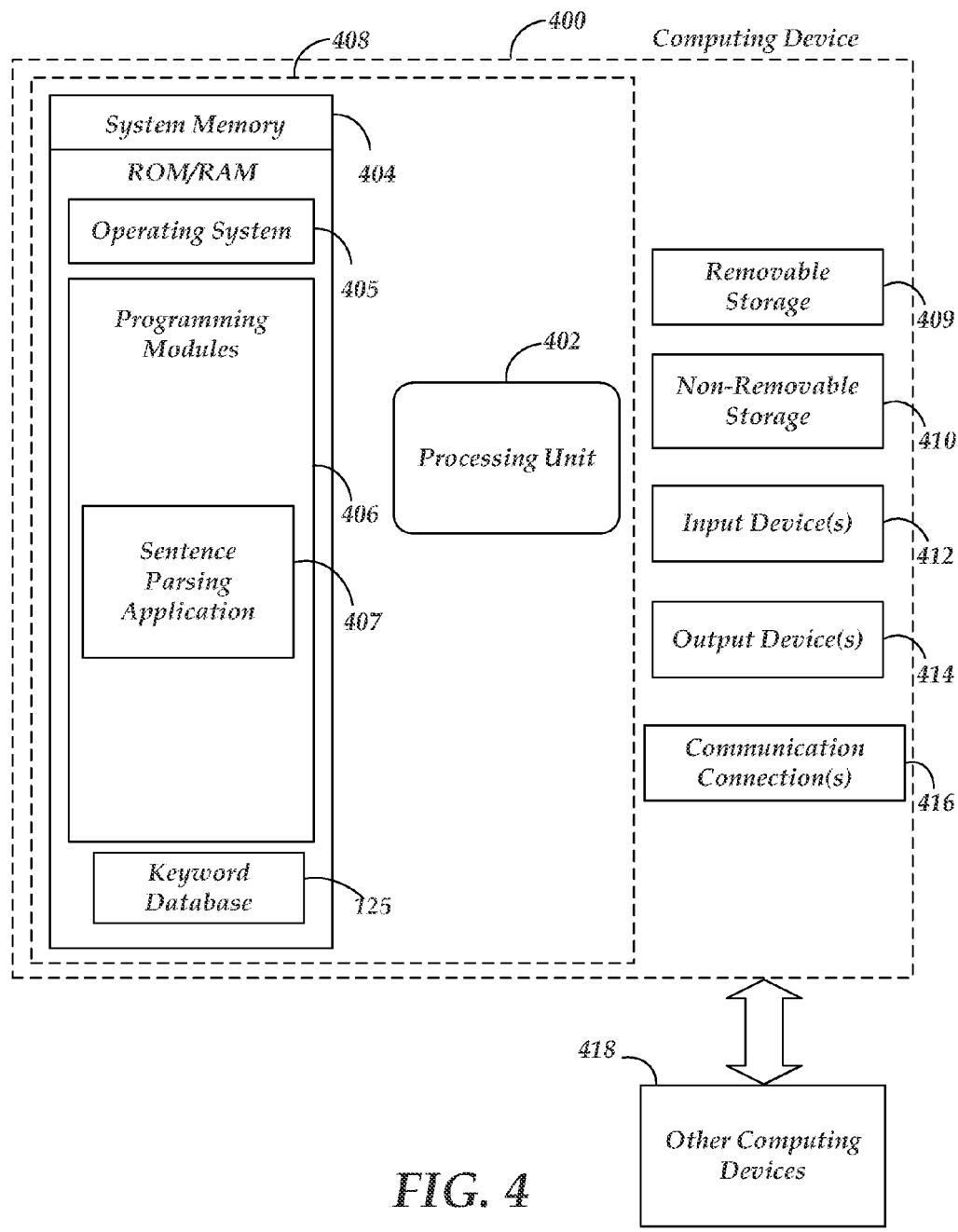
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise operating environment 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may include keyword database 125. Operating system 405, for example, may be suitable for controlling computing device 400's operation. In one embodiment, programming modules 406 may include a sentence parsing application 407. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., sentence parsing application 407) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like.

Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to, mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer-implemented method being performed at a computing device, the method comprising:
   receiving a spoken utterance at the computing device;
   converting the spoken utterance to a text phrase;
   identifying a top level predicate of the text phrase, wherein the top level predicate comprises a word of the text phrase upon which other words of the text phrase depend and which does not depend on other words of the text phrase, wherein the top level predicate is associated with an intent of the text phrase;
   reformatting the text phrase, wherein the reformatted text phrase comprises at least the word corresponding to the top level predicate;
   defining an intent domain based on the reformatted text phrase;
   filling one or more semantic slots of a spoken language understanding application associated with the intent domain with words from the text phrase; and
   performing a task associated with the intent domain and based on information from the filled semantic slots of the spoken language understanding application at the computing device.

2. The method of claim 1, wherein identifying the top level predicate of the text phrase comprises performing a dependency parse on the text phrase.

3. The method of claim 2, wherein performing a dependency parse comprises:
   identifying a top level predicate; and
   excluding at least one auxiliary word in the text phrase.

4. The method of claim 3, wherein the at least one auxiliary word comprises a dependent of the top level predicate.

5. The method of claim 3, wherein the at least one auxiliary word comprises at least one predefined auxiliary keyword.

6. The method of claim 3, wherein identifying the top level predicate comprises evaluating a weighting criterion associated with each word of the text phrase.

7. The method of claim 1, wherein reformatting the text phrase further comprises excluding a word of the text phrase.

8. The method of claim 1, wherein filling one or more semantic slots further comprises filling a slot with an implied word.

9. The method of claim 1, wherein filling one or more semantic slots is performed based in part on the top level predicate and one or more predicates of other clauses of the text phrase.

10. The method of claim 9, wherein the one or more predicates of other clauses are determined recursively.

11. A computer storage device which stores a set of instructions which when executed by a processor performs a method for providing sentence simplification for spoken language understanding, the method executed by the set of instructions comprising:
    identifying a predicate associated with a text phrase, wherein the predicate comprises a word of the text phrase upon which other words of the text phrase depend and which does not depend on other words of the text phrase, wherein the predicate is associated with an intent of the text phrase;
    reformatting the text phrase, wherein the reformatted text phrase comprises at least the word corresponding to the predicate;
    defining an intent domain based on the reformatted text phrase;
    filling one or more semantic slots of a spoken language understanding application associated with the intent domain with words from the text phrase;
    performing a task associated with the defined intent domain and based on information from the filled semantic slots of the spoken language understanding application at the computing device; and
    displaying a result associated with the task.

12. The computer storage device of claim 11, wherein the text phrase comprises a conversion of a spoken phrase received from a user.

13. The computer storage device of claim 11, wherein the text phrase is associated with a web search query and identifying the predicate comprises defining a target domain.

14. The computer storage device of claim 13, wherein the reformatted text phrase comprises at least one keyword associated with the target domain.

15. The computer storage device of claim 14, wherein the target domain comprises a plurality of semantic slots.

16. The computer storage device of claim 11, wherein filling one or more semantic slots further comprises filling a slot with an implied word.

17. The computer storage device of claim 11, wherein filling one or more semantic slots is performed based in part on the top level predicate and one or more predicates of other clauses of the text phrase.

18. The computer storage device of claim 11, wherein identifying the predicate comprises performing a dependency parse on the text phrase.

19. The computer storage device of claim 18, wherein identifying the predicate is determined recursively.

20. A system for providing sentence simplification for spoken language understanding, the system comprising:
    a memory storage; and
    a processing unit coupled to the memory storage, wherein the processing unit is operative to:
    receive a spoken phrase;
    convert the spoken phrase to a text phrase;
    perform a dependency parse on the text phrase;

identify a word corresponding to a top level predicate of the text phrase, wherein the top level predicate comprises a word of the text phrase upon which other words of the text phrase depend and which does not depend on other words of the text phrase, wherein the top level predicate is associated with an intent of the text phrase;

reformat the text phrase, wherein the reformatted text phrase comprises at least the word corresponding to the top level predicate:

define an intent domain based on the reformatted text phrase, wherein the defined intent domain is associated with a spoken language understanding application which comprises a plurality of semantic slots;

fill the plurality of semantic slots of the spoken language understanding application with words from the text phrase;

perform a task associated with the intent domain and based on the information from the filled plurality of semantic slots of the spoken language understanding application; and display a result of the performed task to a user.

\* \* \* \* \*